United States Patent
Frohnhaus et al.

(12)

(10) Patent No.: US 6,264,275 B1
(45) Date of Patent: Jul. 24, 2001

(54) POWER ADJUSTABLE VEHICLE SEAT WITH AN ADAPTABLE SEAT, MORE PARTICULARLY WITH A SEATING THAT IS ADJUSTABLE IN HEIGHT

(76) Inventors: Ernst-Reiner Frohnhaus, Nettelbeckstrasse 4, D-42653 Solingen; Burckhard Becker, Obenkatternberg 25, D-42655 Solingen; Wilfried Beneker, Dierath 1, D-42799 Leichlingen, all of (DE)

( * ) Notice: Subject to any disclaimer, the term of this patent is extended or adjusted under 35 U.S.C. 154(b) by 0 days.

(21) Appl. No.: 09/371,999

(22) Filed: Aug. 11, 1999

(30) Foreign Application Priority Data

Aug. 12, 1998 (DE) .......................................... 298 14 448 U

(51) Int. Cl.$^7$ ...................................................... A47C 3/20
(52) U.S. Cl. .............................. 297/344.12; 297/344.13; 297/344.15; 297/344.17
(58) Field of Search ...................... 297/344.12, 344.13, 297/344.15, 344.17

(56) References Cited

U.S. PATENT DOCUMENTS

| | | | | |
|---|---|---|---|---|
| 4,993,678 | * | 2/1991 | Easter | 297/344.13 X |
| 5,169,113 | * | 12/1992 | Brodersen | 297/344.12 X |
| 5,337,995 | * | 8/1994 | Satoh et al. | 297/344.17 X |
| 5,626,395 | * | 5/1997 | Aufrere | 297/344.15 X |
| 5,709,364 | * | 1/1998 | Araki et al. | 297/344.17 X |
| 5,775,661 | * | 7/1998 | Matsumoto et al. | 297/344.12 X |
| 5,806,824 | * | 9/1998 | Isomura et al. | 297/344.17 X |
| 5,882,061 | * | 3/1999 | Guillouet | 297/344.15 X |

FOREIGN PATENT DOCUMENTS 59-11929 * 1/1984 (JP) ................................. 297/344.12

* cited by examiner

Primary Examiner—Peter M. Cuomo
Assistant Examiner—Rodney B White
(74) Attorney, Agent, or Firm—K. S. Cornaby

(57) ABSTRACT

A power adjustable vehicle seat with a seating that is adjustable in height has a side part and an electromotor. The electromotor comprises a flange-mounted transmission, which transmission is provided with an output shaft and with a transmission case. The side part is provided with a bearing for the output shaft. The transmission case has an area axially facing said bearing for the output shaft. The area facing the side part is open-ended by having no case wall on that open end axially facing the bearing for the output shaft. The side part functions as a case wall of the transmission case once the transmission case is fastened to the side part.

12 Claims, 2 Drawing Sheets

Figure 1:
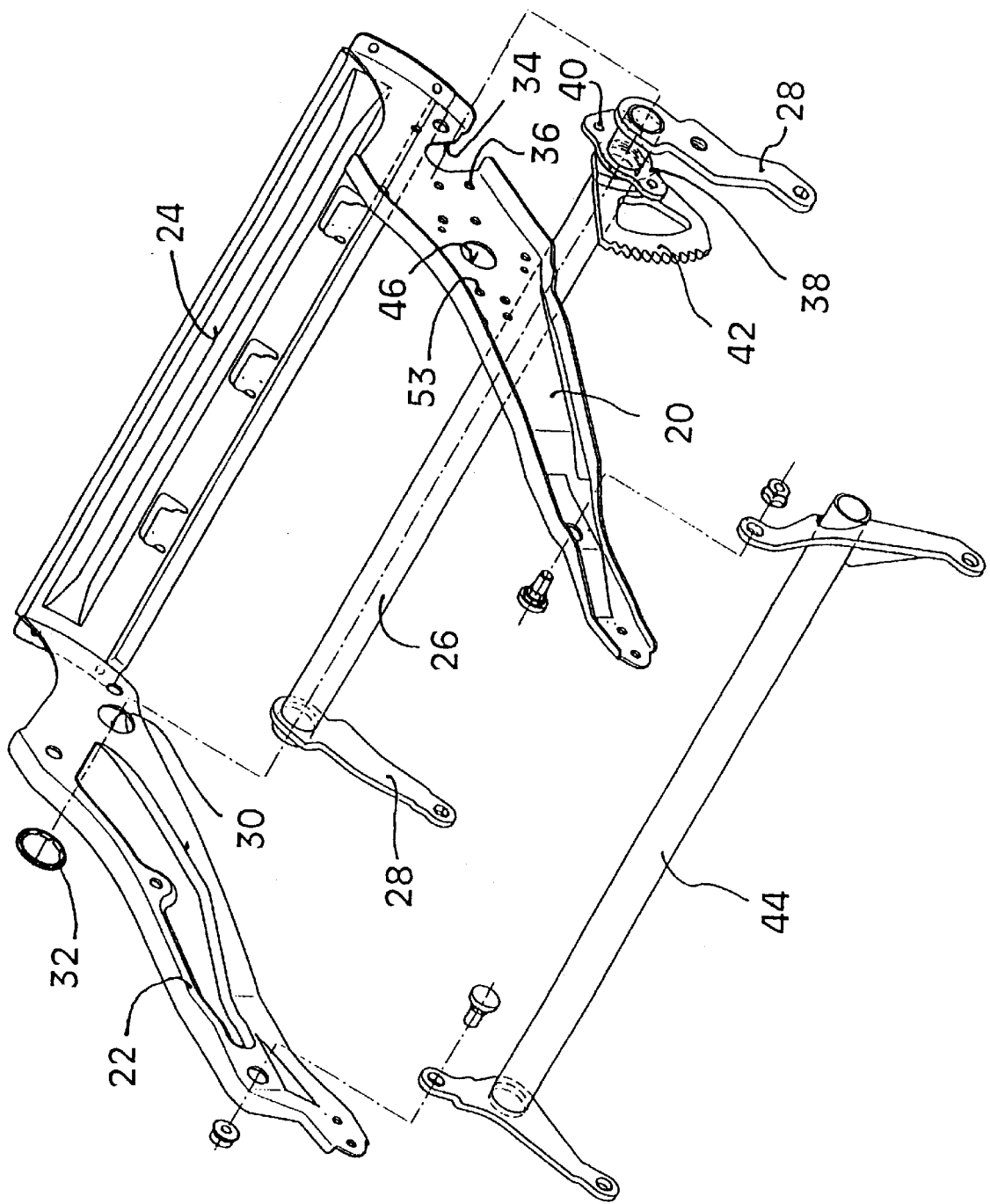

POWER ADJUSTABLE VEHICLE SEAT WITH AN ADAPTABLE SEAT, MORE PARTICULARLY WITH A SEATING THAT IS ADJUSTABLE IN HEIGHT

The invention relates to a power adjustable vehicle seat with an adaptable seat, more particularly with a seating that is adjustable in height, that has a seat side part and an electromotor with a transmission which is provided with an output shaft and with a transmission case constituting a bearing for the output shaft.

Power adjustable vehicle seats of the type mentioned above are known out of many prior publications and are already being used in practice. The known constructions proved effective in principle. The following possibilities to adjust the vehicle seat are possible within the scope of the invention: adjustment of height of the rear edge and/or of the front edge of the seating, adjusting devices with parallelogram arms for example, and so on.

The object of the invention is to develop the known constructions so as to spare weight without incurring a mechanical disadvantage on one side and so as to make sure the electromotor and particularly its output shaft are mounted with accuracy in relation to the other component parts of the adjusting device on the other side.

On the basis of the power adjustable vehicle seat mentioned above, the solution of this object is that the transmission case has no case wall of its own in its area axially facing the bearing, that, in this area, the transmission case is fastened on the side part of the seat which also assumes the function of the lacking case wall of the transmission case and shuts the transmission case and that the side part of the seat is provided with a bearing for the output shaft, said bearing being designed either as an integral part of the side part or as a separate part of it.

According to the invention, weight is spared by the fact that the transmission of the very electromotor is not completely shut and that the function of the lacking case wall of the transmission case is assumed by a side part of the seat. This also spares room. The motor may be mounted nearer to the side part of the seat and the output shaft may be shorter than usual. The bearing of the output shaft for the adjusting device itself gets particularly more precise, since the bearing is now aligned on the adjusting device and no longer on the transmission case. The bearing of the output shaft of the electromotor in the side part of the seat allows thus a precise allocation of the output shaft to said side part of the seat.

The invention allows a very favourable fastening of the transmission on the side part of the seat. Connection means, for example screws, are saved and the transmission case has not to be provided with special fastening means for the reception of positioning screws needed for mounting the completely closed transmission case on the side part of the seat.

In a particularly preferred embodiment of the invention, the clear inside diameter of the bearing in the lateral part of the seat is bigger than the outside diameter of the pinion. The pinion may thus be stuck through the bearing in the side part of the seat, the bearing taking place between the pinion and the transmission. Here, an electromotor with a preassembled pinion may be used. The mounting is made easier. Thanks to the big bearing, the accuracy of the bearing is also improved.

The transmission case of the electromotor's transmission may be of a simple design; it may be designed as a shell for example. It is made in one piece in particular. It preferably has a smooth, even end side on which it is open. The side part of the seat may thus be even around the bearing in the partial area forming the end wall of the transmission case.

The fastening means, preferably threaded pocket holes in the shell-like transmission case made in one piece, that are usually used for fixing a cover of the transmission case, will be directly used to fasten the laterally open transmission case on the side part of the seat which simultaneously assumes the function of an end wall of the transmission case.

In a preferred development the side part of the seat is made of several parts. It has a location indentation for the subsequent mounting of a transverse shaft that joins the two seat sides and that is connected to both seat parts with adjusting arms. This transverse shaft is encompassed by a bearing part that may be fastened on the side part of the seat. This bearing part, being component part of the lateral part of the seat and assuming the bearing of the transverse shaft in the lateral part of the seat, may at the same time assume the function of an end wall of the transmission case.

Further advantages and characteristics of the invention will become clear in the remaining claims and in the following description of an embodiment that is not limiting the scope of the invention. This embodiment is explained in more detail with the aid of the drawing.

Figure 2:
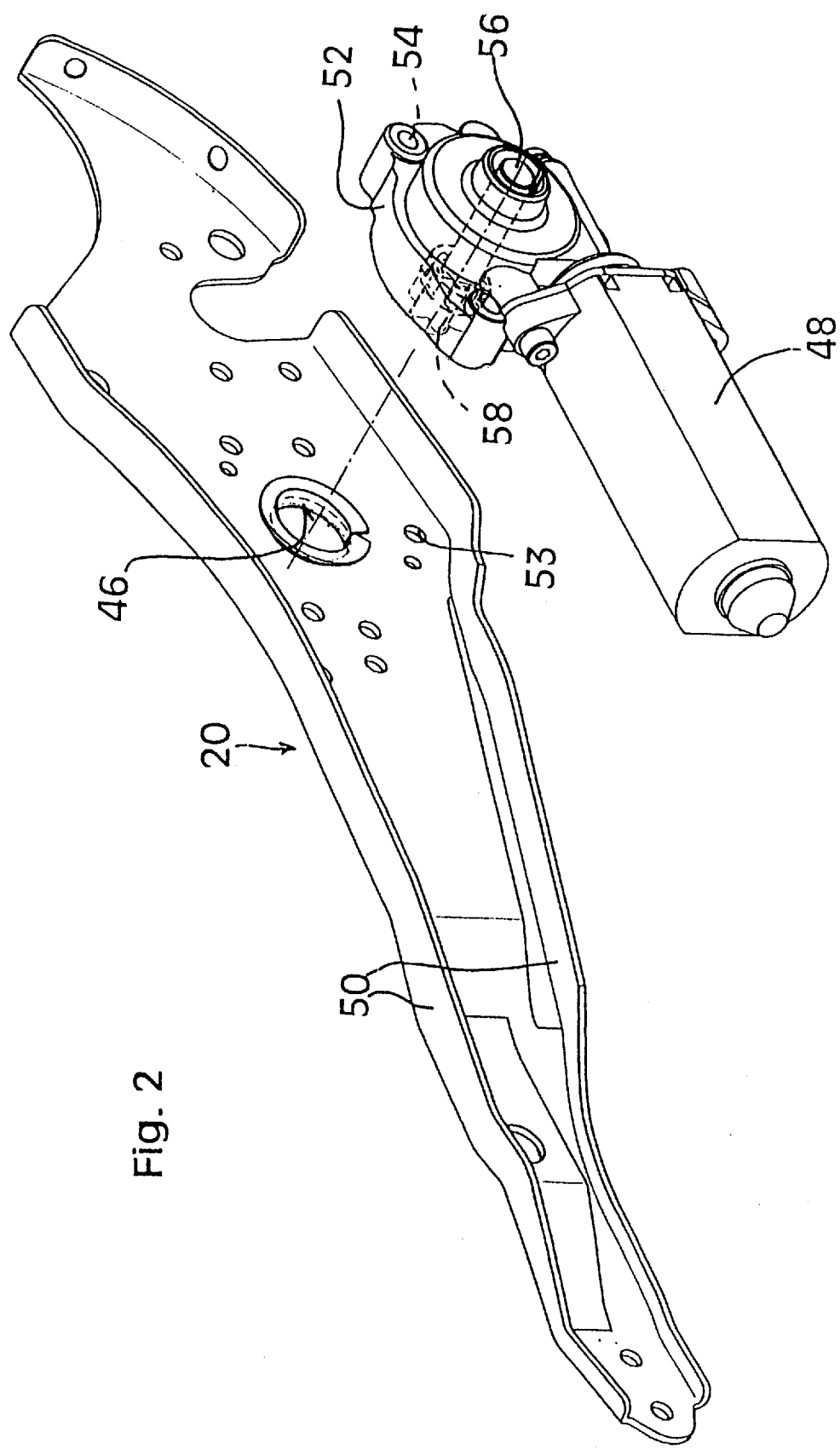

FIG. 1: shows an assembly drawing of a seating of a power adjustable vehicle seat and FIG. 2: shows an exploded view of an electromotor and of a side part of a seat in a mounted position.

With reference to FIG. 1, the seating of a power adjustable vehicle seat is essentially defined by two side parts of a seat designated in the following by the numeral 20 for the left side part and by the numeral 22 for the right side part, and by a rear tie-bar 24 that links the two side parts 20, 22 in their rear area.

A transverse shaft 26 having the shape of a hollow tube and having at either end one adjusting arm 28 is provided. A bore of the bearing 30 is provided for this transverse shaft 26 in the right side part 22. A securing ring 32 is fixing it.

The left side part 20 has no corresponding bore of the bearing. It is instead provided with a location indentation 34 arranged on the site corresponding to the bore of the bearing 30 in the right side part 22. First fastening means 36 are provided around the location indentation 34.

The transverse shaft 26 is encompassed by a bearing part 38 provided with second fastening means 40 corresponding to the first fastening means 36. The bearing part may thus be mounted on the left side part 20 where it bridges over the location indentation 34. In this way, the transverse shaft 26, together with its adjusting arms 28, the bearing part 38 and a driving part 42, which is here designed as a toothed quadrant, may subsequently be inserted into a seat support as described above.

A front swivel bridge 44 is provided in the front area of the seat and serves to adjust the height of the seat's front edge.

A boring is provided in the left side part 20 and is placed more to the front relative to the location indentation 34. As may be seen in FIG. 2, it is designed as a bearing 46. First fastening means 53 are arranged around this bearing. The side part 20 also has an upper and a lower border area 50 placed across its main surface. This border area is pointing outwards.

An electromotor 48 with a transmission case 52 is provided. The transmission case is designed as a shell being open towards the side part 20. There, several second fastening means 54 designed as tap holes are provided. They are coinciding with the first fastening means 53. The transmission case 52 is designed so that usually a cover may be screwed onto it. The cover has borings traversed by screws that are meshing in the second fastening means 54. Such a cover is not provided for the transmission case 52 according to FIG. 2. The transmission case 52 only bears an output shaft 56 of the electromotor 48 on one end side of this output shaft 56. A pinion 58 is arranged on the other end side of the output shaft 56. The output shaft 56 is so long that the pinion 58 is projecting clearly beyond the transmission case, particularly beyond its front, open edge.

A bearing area having a diameter bigger than the pinion's 58 is located between the pinion 58 and the described position of the output shaft 56. The clear diameter of the bearing 46 is also bigger than the outside diameter of the pinion 58. The pinion 58 may thus be pushed through the bearing 46. After the pinion 58 was pushed through, the bearing 46 gets in touch with the described bearing area of the output shaft 56. The second bearing of the output shaft 56 is thus directly reached in the left side part 20.

When the prefabricated transverse shaft unit consisting of the transverse shaft 26, the two adjusting arms 28 of each side, the bearing part 38 and the driving part 42 is mounted, the side part 20 is located between the adjusting arm 28 of the left side and the driving part 42. The pinion 58 gets directly engaged with the toothed quadrant of the driving part 42.

The terms left and right as well as front and back used in the description have always been chosen relative to a passenger sitting on the seat.

In a modification of the construction represented according to the two figures, designing the side part so that it has several parts is also possible. In the embodiment described above, the side part 20 is essentially made of one piece. An additional part may now be provided that is constituted by the bearing part 38 and that is assuming the bearing and/or the closing of the open case side of the transmission case. It is for example possible to design the bearing part 38 bigger, so that it constitutes at the same time the bearing of the output shaft 56 as well as the closing of the transmission case 52. An alternative is to provide an additional part that is assigned to the side part 20. This part is fastened on the side of the left side part 20 facing the electromotor 48 and constitutes a bearing for the pinion's point.

What is claimed is:

1. Power adjustable vehicle seat with seating which is adjustable in height and has a side part and an electromotor, the electromotor having a flange-mounted transmission, which transmission is provided with an output shaft and a transmission case adapted to be fastened to the side part, the side part being provided with a bearing for the output shaft; said transmission case having a side axially facing said bearing for the output shaft, said side facing the side part being open-ended, where said open-ended side is axially facing the bearing for the output shaft, the side part acting as a cover on the open-ended side of the transmission case once the transmission case is fastened to the side part.

2. Vehicle seat according to claim 1, wherein a pinion is arranged on said output shaft, said pinion has an outside diameter, said bearing of said side part has a clear inside diameter, said clear inside diameter of said bearing in said side part is greater than said outside diameter of said pinion, so that said pinion may be inserted through said bearing of said side part.

3. Vehicle seat according to claim 1, wherein said side part has a bore having a diameter sufficient in size to receive said bearing, said side part being constant in thickness at the diameter of said bore receiving said bearing.

4. Vehicle seat according to claim 1, wherein a first fastening means is provided in said side part adjacent said bearing; said transmission case further having a second fastening means which second fastening means is provided in said transmission case, said first fastening means and said second fastening means being aligned and cooperating for a fixation of said transmission case onto said side part.

5. Vehicle seat according to claim 4, wherein said first fastening means is designed as bearings and said second fastening means are tap holes.

6. Vehicle seat according to claim 1, wherein said seat side part has a rim area and a main surface inside said rim area, said rim area projecting obliquely from said main surface, and said rim area projecting towards said electromotor.

7. Vehicle seat according to claim 6, wherein said side part has an outer side and said rim area is located above and underneath said electromotor as well as on said outer side of said side part.

8. Vehicle seat according to claim 1, wherein a pinion is connected to said output shaft, said side part is located between said pinion and said electromotor.

9. Vehicle seat according to claim 1, wherein said bearing of said output shaft is made as a separate bearing piece and is connected to said side part.

10. Vehicle seat according to claim 9, wherein said bearing is formed as an integral part of a bearing part, said bearing part a) bearing a transverse shaft and b) being connectable to said side part.

11. Vehicle seat according to claim 1, wherein said bearing is designed as an integral part of said side part.

12. Vehicle seat according to claim 1, wherein said bearing is designed as a separate part of said side part.

* * * * *